(12) United States Patent  (10) Patent No.: US 9,133,289 B2
Suzuki  (45) Date of Patent: Sep. 15, 2015

(54) SCRATCH-RESISTANT FILM

(75) Inventor: Yasuhiro Suzuki, Tokyo (JP)

(73) Assignee: RIKEN TECHNOS CORPORATION, Tokyo (JP)

( * ) Notice: Subject to any disclaimer, the term of this patent is extended or adjusted under 35 U.S.C. 154(b) by 121 days.

(21) Appl. No.: 14/006,377

(22) PCT Filed: Mar. 7, 2012

(86) PCT No.: PCT/JP2012/055871
§ 371 (c)(1),
(2), (4) Date: Nov. 14, 2013

(87) PCT Pub. No.: WO2012/128050
PCT Pub. Date: Sep. 27, 2012

(65) Prior Publication Data
US 2014/0057117 A1  Feb. 27, 2014

(30) Foreign Application Priority Data
Mar. 22, 2011 (JP) .................................. 2011-062883

(51) Int. Cl.
C08F 20/10 (2006.01)
C08G 18/62 (2006.01)
C09D 175/04 (2006.01)
C08G 18/79 (2006.01)
C08J 5/18 (2006.01)

(52) U.S. Cl.
CPC ............ *C08F 20/10* (2013.01); *C08G 18/6295* (2013.01); *C08G 18/792* (2013.01); *C08J 5/18* (2013.01); *C09D 175/04* (2013.01); *C08J 2387/00* (2013.01); *Y10T 428/31551* (2015.04)

(58) Field of Classification Search
CPC ..................................................... C08F 20/10
USPC ..................................... 428/423.1; 525/326.5
See application file for complete search history.

(56) References Cited

U.S. PATENT DOCUMENTS 4,728,571 A * 3/1988 Clemens et al. .............. 428/352
5,684,084 A   11/1997 Lewin et al.
7,122,599 B2 * 10/2006 Haubennestel et al. ...... 525/100

FOREIGN PATENT DOCUMENTS

| JP | 04292674 | | 10/1992 |
| JP | 11228905 | A | 6/1999 |
| JP | 2001011376 | A | 1/2001 |
| JP | 2003118061 | A | 4/2003 |
| JP | 2007063461 | | 3/2007 |
| JP | 2012053382 | A | 3/2012 |

OTHER PUBLICATIONS

European Search Report of Corresponding PCT Appl. No. PCT/JP2012/055871, dated Aug. 19, 2014

* cited by examiner

*Primary Examiner* — Thao T Tran
(74) *Attorney, Agent, or Firm* — William H. Dippert; Eckert Seamans Cherin & Mellott, LLC

(57) ABSTRACT

The present invention provides a paint film which is superior in scratch resistance, weather resistance, stain resistance, chemical resistance, bending durability and impact resistance and is useful as a scratch resistant film or a decorative film. The film is obtained by cross-linking a vinyl compound copolymer with polyisocyanate, wherein the vinyl compound copolymer comprises the following monomer units: (A) a mole % of a vinyl compound which has no siloxane structure, nor hydroxyl group; (B) b mole % of a vinyl compound which has a polydimethylsiloxane structure and no hydroxyl group; (C) c mole % of a vinyl compound which has a linear or branched alkyl group having a hydroxyl group, the alkyl group having 1 to 6 carbon atoms; and (D) d mole % of a vinyl compound represented by the formula:

$$CH_2=C(R)-COO-Y$$

wherein R is H or $CH_3$, and Y is a saturated hydrocarbon group with a hydroxyl group at an end and, optionally, one or more lactone, carbonate, ester, ether, or urethane groups.

20 Claims, No Drawings

SCRATCH-RESISTANT FILM

CROSS-REFERENCE TO RELATED APPLICATIONS

This application is a U.S. National Phase filing of co-pending, commonly owned PCT Patent Application No. PCT/JP2012/055871, filed Mar. 7, 2012, which is based upon and claims the benefit of the priority of Japanese Patent Application No. 2011-62883, filed on Mar. 22, 2011, the contents of each which are hereby incorporated by reference.

FIELD OF THE INVENTION

The present invention relates to a film which is used for protecting or decorating surface of articles, or instead of directly coating articles with paint. More particularly, the present invention relates to a film for protecting or decorating surface of automobile exterior parts, wall materials, floor materials, or household appliances such as refrigerators.

BACKGROUND OF THE INVENTION

Conventionally, automobile exterior parts, such as door sash, were directly coated with hardening resin paint such as a melamine resin, an isocyanate resin and a urethane resin, depending on materials of the parts, in order to provide the parts with scratch resistance, weather resistance, durability, stain resistance, corrosion resistance and design.

Housings of household appliances were directly coated with hard coat paint of an ultraviolet curable acrylic resin, in order to provide the housings with scratch resistance, durability, stain resistance and design.

However, such direct coating is associated with such problems that many steps, such as masking of areas not to be coated, coating, hardening and finishing, are necessary; preservation of work environment and management for safety and health are necessary in handling a solvent for paint; skill is necessary for forming a uniform and defect-free coating; and spray coating limits variety of design. Further, the ultraviolet curable hard coat paint is easily deteriorated by ultraviolet and, therefore, does not provide sufficient weather resistance.

Therefore, it was proposed to use a decorative film instead of the direct coating (see Patent Literature 1). The use of a decorative film solves the problems on workability, environment safety and design which occur in the direct coating. However, the film is poor in scratch resistance, weather resistance, durability, stain resistance and corrosion resistance.

A hardened product of a polydimethylsiloxane type copolymer having polycaprolactone and polysiloxane incorporated into a backbone of the compolymer was proposed as a material for a paint film having an increased scratch resistance (see Patent Literature 2). However, its scratch resistance, weather resistance, durability, stain resistance, corrosion resistance, bending durability, curved surface-following property, and impact resistance are not yet enough.

Patent Literature 1: Japanese Patent Application Laid-Open No. 2003-118061
Patent Literature 2: Japanese Patent No. 3999411

SUMMARY OF THE INVENTION

Purpose of the Invention

An object of the present invention is to provide a film which is used for protecting or decorating surface of articles, instead of directly coating articles with paint, and is excellent in scratch resistance.

Means for Achieving the Purpose

The present inventor has found that when a vinyl compound having the specific number of carbon atoms is a monomer in a vinyl compound copolymer a paint film obtained by cross-linking the copolymer with polyisocyanate is excellent, in particular, in scratch resistance, i.e., resilience from scratch and resistance to friction-induced scratch, and in low-temperature impact resistance and stain resistances, and achieved the present invention.

The resilience from scratch means a property that when pressure is exerted on a surface of a paint film, the film immediately deforms elastically and does not easily crack; when the pressure is removed, the deformed film goes back to its original form without leaving plastic deformation.

Thus, the present invention is a film obtained by cross-linking a vinyl compound copolymer with polyisocyanate, wherein the vinyl compound copolymer comprises the following monomer units:
(A) a mole % of a vinyl compound which has no siloxane structure, nor hydroxyl group;
(B) b mole % of a vinyl compound which has a polydimethylsiloxane structure and no hydroxyl group;
(C) c mole % of a vinyl compound which has a linear or branched alkyl group having a hydroxyl group, the alkyl group having 1 to 6 carbon atoms; and
(D) d mole % of a vinyl compound represented by the following formula:

$$CH_2=C(R)-COO-Y$$

wherein R is H or $CH_3$, and Y is a linear or branched saturated hydrocarbon group with a hydroxyl group at an end and, optionally, may have one or more groups selected from the group consisting of a ring-opened lactone group, i.e., $-CO-(CH_2)_n-O-$ wherein n is an integer of 4 to 6, a carbonate group, i.e., $-O-CO-O-$, an ester group, i.e., $-CO-O-$, an ether group, i.e., $-O-$, and a urethane group, i.e., $-NH-CO-O-$, and Y has 40 to 120 carbon atoms, and a to d meet the following equations:

$$a+b+c+d=100$$

(1) $0<\{b/(a+b)\}\times 100 \leq 5$, (2) $3(c+d)/4 \leq (a+b) \leq 4(c+d)$, and (3) $4d/3 \leq c \leq 40d$.

The present invention also provides a film having the aforesaid film laminated on at least one side of a thermoplastic resin film.

Effects of the Invention

The present film and the present laminated film exhibit viscoelastic behavior according to Voigt model and, therefore, are superior in resilience from scratch and resistance to friction-induced scratch, and also superior in stain resistance, weather resistance, chemical resistance, bending durability and impact resistance. Accordingly, they are useful as an alternative to direct coating of paint on surface of articles, such as wall materials, household appliances and automobile parts, for example, as a scratch resistant film or a decorative film.

EMBODIMENTS OF THE INVENTION

The present film is obtained by cross-linking a vinyl compound copolymer with polyisocyanate. The vinyl compound copolymer comprises the following monomer units (A) to (D).

Monomer (A)

Monomer (A) is a vinyl compound which has no siloxane structure, nor hydroxyl group. Examples of monomer (A) include (meth)acrylic acid esters such as methyl (meth)acrylate, ethyl (meth)acrylate, n-butyl (meth)acrylate, isobutyl (meth)acrylate, 2-ethylhexyl (meth)acrylate, cyclohexyl (meth)acrylate, tetrahydrofurfuryl (meth)acrylate, 2-stearyl (meth)acrylate and lauryl (meth)acrylate; alkyl vinyl ethers such as methyl vinyl ether, ethyl vinyl ether, n-propyl vinyl ether, n-butyl vinyl ether and isobutyl vinyl ether; aromatic vinyl compounds such as styrene and α-methyl styrene; cyano group-containing vinyl compounds such as acrylonitrile and methacrylonitrile; vinyl carboxylates such as vinyl acetate; halogen-containing vinyl compounds such as vinyl chloride, vinylidene chloride, vinyl fluoride and vinylidene fluoride; epoxy group-containing vinyl compounds such as glycidyl (meth)acrylate and allyl glycidyl ether; carboxyl group-containing vinyl compounds such as acrylic acid and methacrylic acid; and amide group-containing vinyl compounds such as (meth)acrylamide. Among these compounds, methyl (meth)acrylate, ethyl (meth)acrylate and n-butyl (meth)acrylate are preferred.

Monomer (B)

Monomer (B) is a vinyl compound which has a polydimethylsiloxane structure and no hydroxyl group. This vinyl compound (B) provides the present film with lubricity and, as a result, can increase scratch resistance of the film. In general, if a compound having a siloxane structure, like the present monomer (B), is present in a free form in a paint composition, the compound bleeds out because of its inferior compatibility or low miscibility with other components in the composition. As a result, stain resistance is low. On the other hand, in the present invention, monomer (B) is present as a constituent of the vinyl compound copolymer, not in a free form, and, therefore, increases scratch resistance without decreasing stain resistance.

Monomer (B) is preferably polydimethylsiloxane having an acrylic acid ester or methacrylic acid ester residue on one end, in view of easy polymerization with the other vinyl monomers. The molecular weight of monomer (B) is preferably 1,000 to 30,000 to provide lubricity. If the molecular weight exceeds 30,000, less lubricity is provided. Further, it is difficult to synthesize a monomer having such a high molecular weight.

Monomer (B) is commercially available. The polydimethylsiloxane modified with methacryl at one end includes, for example, X-22-2426 (molecular weight: approximately 14,000) and X-22-174DX (molecular weight; approximately 5,000), ex Shin-Etsu Chemical Co., Ltd., and AK-32 (molecular weight; approximately 20,000), ex Toagosei Chemical Industry Co., Ltd. Alternatively, X-22-173D, ex Shin-Etsu Chemical Co., Ltd., which is polydimethylsiloxane modified with epoxy at one end and has a molecular weight of approximately 5,000 may be introduced, in a known method, into a copolymer of monomers (A), (C) and (D) at a site of a carboxyl group derived from acrylic acid or methacrylic acid which has already been introduced in the copolymer.

Monomer (C)

Monomer (C) is a vinyl compound which has a linear or branched alkyl group having a hydroxyl group, the alkyl group having 1 to 6 carbon atoms, preferably 2 to 4 carbon atoms. Examples of monomer (C) include, for example, 2-hydroxyethyl acrylate, 2-hydroxyethyl methacrylate, 2-hydroxypropyl acrylate, 2-hydroxypropyl methacrylate, 4-hydroxybutyl acrylate, 4-hydroxybutyl methacrylate, hydroxyethyl acrylamide and allyl alcohol. Among these compounds, 2-hydroxyethyl acrylate and 2-hydroxyethyl methacrylate are preferred.

Monomer (D)

Monomer (D) is a vinyl compound represented by the following formula:

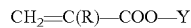

$CH_2=C(R)-COO-Y$ wherein R is H or $CH_3$, and Y is a linear or branched saturated hydrocarbon group with a hydroxyl group at an end and, optionally, may have one or more groups selected from the group consisting of a ring-opened lactone group, i.e., $-CO-(CH_2)_n-O-$, wherein n is an integer of 4 to 6, a carbonate group, i.e., $-O-CO-O-$, an ester group, i.e., $-CO-O-$, an ether group, i.e., $-O-$, and a urethane group, i.e., $-NH-CO-O-$ (hereinafter, these groups may be collectively referred to as "the ring-opened lactone group and so on"), and Y has 40 to 120 carbon atoms. The number of the carbon atoms in Y is significant for scratch resistance. If the number is less than 40, the resulting paint film is inferior in scratch resistance and also in low-temperature impact resistance. If the number exceeds 120, stain resistance is bad. The number is preferably 46 to 90.

Monomer (D) may be obtained, for example, by dehydration condensation of (meth)acrylic acid with a long-chain glycol having a hydroxyl group at each end, represented by the formula, HO—Y, e.g., a long-chain glycol having a molecular weight of 594 to 1714 (number of carbon atoms: 40 to 120).

Y may optionally have the aforesaid ring-opened lactone group and so on. The presence of these groups is preferred in view of easy control of the number of carbon atoms in Y. More preferably, Y has the polylactone structure and/or the polycarbonate structure. When Y is branched, it is preferred that the ring-opened lactone group and so on is present in a main chain rather than in a side chain. It is noted that in the case where Y has the ring-opened lactone group and so on, the number of carbon atoms in Y includes the number of carbon atoms in the ring-opened lactone group and so on.

Monomer (D) wherein Y has the ring-opened lactone group may be obtained, for example, by dehydration condensation of (meth)acrylic acid with polycaprolactone diol. The dehydration condensation may be carried out according to a known method, for example, by heating these compounds in the presence of an acid catalyst such as p-toluenesulfonic acid and a polymerization inhibitor such as hydroquinone and methyl hydroquinone in an organic solvent such as benzene and toluene under reflux. Examples of the polycaprolactone diol include, for example, Placcel 210 (the number of carbon atoms; 50) and Placcel 220 (the number of carbon atoms: 104), ex Daicel Corporation. Commercially available examples of monomer (D), wherein Y has a poly(ring-opened lactone) structure, include, for example, Placcel FA10L (adduct of hydroxyethyl acrylate with 10 moles of caprolactone, $CH_2=CH-COO-C_2H_4-O-(CO-C_5H_{10}-O)_{10}-H$, the number of carbon atoms in Y: 62), ex Daicel Corporation.

Monomer (D), wherein Y has the polycarbonate structure, may be prepared by dehydration condensation of (meth)acrylic acid with polycarbonate diol. Examples of the polycarbonate diol include, for example, Placcel CD210 (the number of carbon atoms: 48) and Placcel CD220 (the number of carbon atoms: 97), ex Daicel Corporation.

The vinyl compound copolymer in the present invention is obtained by copolymerization of monomer (A) to (D). When the amounts of monomer (A) to (D) are expressed as a mole %, b mole %, c mole % and d mole %, respectively, they need to meet the following equations:

$$a+b+c+d=100,$$

(1) $0.21 \{b/(a+b)\} \times 100 \leq 5,$ (2) $3(c+d)/4 \leq (a+b) \leq 4(c+d),$ and (3) $4d/3 \leq c \leq 40d.$ Equation (1) shows a relation between the molar amounts of monomers (A) and (B) which have no hydroxyl group and means that the molar amount of monomer (B) is at most 5% of the total molar amount of monomers (A) and (B). If the amount of monomer (B) is more than the upper limit, stain resistance may be lower. The amount depends on a content of the polydimethylsiloxane structure in monomer (B) used and is preferably 0.5% or more of the total molar amount of monomers (A) and (B) in order to provide the present film with lubricity.

Equation (2) shows a relation of the total molar amount of monomers (A) and (B) which have no hydroxyl group with the total molar amount of monomers (C) and (D) which have a hydroxyl group. Considering the equation, $a+b+c+d=100$ or $c+d=100-(a+d)$, equation (2) means $42.9 \leq a+b \leq 80$ and, therefore, $20 \leq c+d \leq 57.1$.

If $a+b > 4$ $(c+d)$, i.e., $a+b > 80$, cross-linking density is too low and, therefore, heat resistance, weather resistance and chemical resistance are too low. If $3(c+d)/4 > a+b$, i.e., $a+b < 42.9$, cross-linking density is too high, which results in a rigid and glassy cured film and, therefore, resilience from scratch is not attained. Preferably, $5(c+d)/6 \leq a+b \leq 5$ $(c+d)$. This means $45.5 \leq a+b \leq 71.4$ and, therefore, $28.6 \leq c+d \leq 54.4$, considering the equation, $c+d=100-(a+b)$.

Equation (3) shows a relation between the molar amounts of monomers (C) and (D) which have a hydroxyl group. If $4d/3 > c$, that is, if the amount of monomer (c) is too little or the amount of monomer (D) is too much, cross-linking density is too low and, therefore, stain resistance, heat resistance, weather resistance and chemical resistance are low. Scratch resistance may be also low. If $c > 40d$, that is, if the amount of monomer (C) is too much or the amount of monomer (D) is too little, cross-linking density is too high, which results in a rigid and glassy cured film. Therefore, resilience from scratch is not attained. Bending durability and impact resistance may be also low. Preferably, c and d meet the equation, $8d/5 \leq c \leq 8d$, more preferably, $2d \leq c \leq 4d$.

The vinyl compound copolymer is usually prepared by solution polymerization. Examples of a solvent in the solution polymerization include aromatic hydrocarbon solvents such as toluene and xylene; ketone solvents such as acetone, methyl ethyl ketone and methyl isobutyl ketone; ester solvents such ethyl acetate, propyl acetate, isobutyl acetate and butyl acetate; and alcohol solvents seen as ethanol, isopropanol, butanol and isobutanol. These solvents may be used alone or in a mixture of two or more solvents. If necessary, use maybe made of a polymerization initiator such as benzoyl peroxide, lauryl peroxide, cumene hydroperoxide and azobisisobutyronitrile. The polymerization temperature is preferably 60 to 160° C. and the reaction time is preferably 5 to 15 hours.

The resulting vinyl compound copolymer is then mixed with polyisocyanate to obtain a paint mixture. This paint can be applied to a surface of a thermoplastic resin film and then cross-linked at room temperature or under heating to obtain the present laminated film. The present film is obtained by releasing the thermoplastic resin film from the laminated film.

The method for applying the paint is not particularly limited. Any known web coating method may be used. Specific examples of the coating method include roll coating, gravure coating, reverse coating, roll brushing, spray coating, air knife coating and die coating. The resulting paint film preferably has a thickness of 10 to 100 μm after dried and cured. If the paint film is too thin, resilience from scratch may not be attained. If the paint film is too thick, the paint may draw down during its application. Further, costs may be unnecessarily high.

The polyisocyanate is a compound having the structure, $-N=C=O$. Specific examples of the polyisocyanate include methylene bis(4-cyclohexylisocyanate), an adduct of tolylene diisocyanate with trimethylolpropane, an adduct of hexamethylene diisocyanate with trimethylolpropane, an adduct of isophorone, diisocyanate with trimethylolpropane, an isocyanurate derived from tolylene diisocyante, an isocyanurate derived from hexamethylene diisocyanate, an isocyanurate derived from isophorone diisocyanate, a biuret derived from hexamethylene diisocyanate, and a urethane cross-linking agent such as a blocked isocyanate including one where any of the polyisocyanates exemplified above is blocked. Among these, methylene bis(4-cyclohexylisocyanate), an adduct of hexamethylene diisocyanate with trimethylolpropane, an adduct of isophorone diisocyanate with trimethylolpropane, an isocyanurate derived from hexamethylene diisocyanate, an isocyanurate derived from isophorone diisocyanate, and a biuret derived from hexamethylene diisocyanate are preferred. In the cross-linking, a catalyst such as dibutyl tin dilaurate and dibutyl tin diethylhexoate may be added, if necessary.

The amount of the polyisocyanate is such that the ratio of the molar amount of the hydroxyl groups in the vinyl compound copolymer to the molar amount of the isocyanate groups in the polyisocyanate is preferably 1:0.7 to 1:1.4, more preferably 1:0.9 to 1:1.2. If the amount of the isocyanate groups is too little, stain resistance or weather resistance may be low. If it is too much, resilience from scratch or bending durability may be low.

The cross-linking may be carried out by drying at room temperature or by drying under heating. For example, the drying at room temperature may be carried out over 6 hours to one week. The drying under heating may be carried out at 40 to 300° C. over 5 seconds to 120 minutes. It is desirable to appropriately select the temperature and the time for the drying, depending on natures of a thermoplastic resin film to which the paint mixture is applied. In some cases, a combination of the drying under heating with the drying at room temperature may be done. In a case where the thermoplastic resin film with a lower softening temperature is subjected to the drying under heating, the thermoplastic resin film may soften in the drying to cause defects such as break, wrinkle and shrinkage. In order to prevent such, the thermoplastic resin film may be fixed onto a support such as metal, glass, ceramic, thermosetting resin or thermoplastic resin having a higher softening point, before coated with the paint mixture and dried.

Examples of the thermoplastic resin film to which the paint is applied include, for example, a polyvinyl chloride resin film, a non-crystalline, low-crystalline or crystalline polyester film, a film of polyolefin such as polypropylene and polyethylene, a film of a styrene resin such as acrylonitrile-butadiene-styrene copolymer resin (ABC resin) and styrene-ethylene-butadiene-styrene copolymer and its hydrogenated one, films of other thermoplastic resins such as polyamide, acrylic resin, polycarbonate and polyurethane. These films include a non-drawn film, a uniaxially-drawn film and a biaxially-drawn film. In particular, a non-drawn film of polyvinyl chloride resin or of non-crystalline polyester resin and a drawn film of crystalline polyester are preferred. In the case where the thermoplastic resin film is coated with the paint to obtain a laminated film, from which the thermoplastic resin film is then peeled off to obtain the present film, it is preferred that a surface of the thermoplastic resin film on which the paint is applied is, in advance, given with a releasing agent.

The thickness of the thermoplastic resin film is not particularly limited. The thickness is usually 20 to 500 μm, preferably 75 to 300 μm for application of the laminated film to vacuum forming, membrane pressing, air pressure forming, in-mold forming or insert molding as described below.

In a case where the present laminated film is embossed on the surface opposite to the thermoplastic resin film, i.e., on the surface of the paint film, in order to, for example, provide the surface with design, the embossing may be difficult because the paint film deforms elastically. In such a case, it is preferred that the paint film has a thickness of 10 to 30 μm and the thermoplastic resin film has a thickness of 80 to 300 μm, and the embossing roll has a surface roughness Rz of 20 μm or more, so that a good emboss patters is obtained.

The present film and the present laminated film are superior in resilience from scratch and stain resistance and also in weather resistance, chemical resistance, bending durability and impact resistance. Therefore, they are useful as an alternative to direct coating of paint on a surface of an article, for example, as a scratch-resistant film or a decorative film. For example, they may suitably be used on surface of articles including automobile parts such as door sash, molding, fender and bumper, housings and information display parts of household appliances, wall materials and floor materials of buildings, and articles of furniture.

In the case where the present film or the present laminated film is adhered onto a member having a planar shape such as wall materials, floor materials, image graphics, and automobile door sash, a pressure sensitive adhesive layer or an adhesive layer may be provided on one side of the present film or on the thermoplastic resin film of the present laminated film, and the film is then cut into a desired shape and adhered onto the member. In order to prevent air from being entrapped between the present film or the present laminated film and the member, thereby preventing a blister on the surface of the film, thus deterioration in appearance of the film, the surface of the pressure sensitive adhesive layer or the adhesive layer is preferably provided with grooves for deaeration. On the other hand, such grooves may cause depressions on the corresponding parts of the surface of the present film to deteriorate the appearance of the film. In order to prevent this problem, it is preferred that the grooves have a width of 10 to 200 μm, more preferably 50 to 150 μm, and a depth of 5 to 50 μm, more preferably 10 to 30 μm, and are semicircular in cross section. Further, it is recommended that the grooves are arranged so that the adhesive layer partitioned by the grooves is in a repeated arrangement of regular triangle, regular tetragon, rhombus or regular hexagon when the surface of the adhesive layer having the grooves is vertically viewed.

In the case where the present film or the present laminated film is used for protecting or decorating a surface of a member having a three-dimensional and complex shape, such as housings of household appliances and automobile instrument panel, shift knob and assist grip, an assembling molding method may be used which includes vacuum forming, membrane pressing, air pressure forming, in-mold forming and insert molding. In the assembling molding method, it is preferred that a pressure sensitive adhesive layer or an adhesive layer is provided on one side of the present film or on the thermoplastic resin film of the present laminated film and the film is then assembled with the member. In the vacuum forming, the thermoplastic resin film preferably has a glass transition temperature of 60 to 130° C. so as to follow the complex shape of the member. Specifically, an acrylic resin film, a polyvinyl chloride resin film, a polyester resin film and an acrylonitril-butadiene-styrene copolymer resin film are preferred. The laminated film is stretched in the vacuum forming. Therefore, the amount of isocyanate group in the polyisocyanate is preferably 0.7 to 1.2 equivalents per equivalent of the hydroxyl group in the vinyl compound copolymer.

In the following, the present invention will be illustrated by the Examples, but are not limited thereto.

EXAMPLES

Example 1

In a nitrogen atmosphere, 100 parts by mass of methyl isobutyl ketone were put into a 500 ml-volume flash and heated to 100° C. To this at 100° C. added was dropwise a mixture consisting of 14 parts by mass of monomer (A), 15 parts by mass of monomer (B), 15 parts by mass of monomer (C), 57 parts by mass of monomer (D) and 1 part by mass of 2,2'-azobisisobutyronitrile (ex Japan Finechem Company, Inc., ABN-R) over three hours, followed by heating to reflux for 6 hours to obtain a desired copolymer (solid content; 50%). Mole percentages of monomers (A) to (D) are shown in Table 1, together with the parts by mass in parentheses.

One hundred parts by mass of the vinyl compound copolymer obtained were mixed with 34 parts by mass of polyisocyanate to obtain paint. A surface of the polyester film, Cerapeel 38 (trade name, ex Toray Advanced Film Co., Ltd.), on which surface a releasing agent had been applied, was coated with the paint at a dry thickness of 50 μm, then heated at 150° C. for 30 minutes and further allowed to stand at room temperature for 24 hours to form a paint film. The paint film was released from the Cerapeel 38 to obtain a desired film (P) which was then subjected to the following tests (1) to (13). The results are as shown in Table 1.

Examples 2 to 19 and Comparative Examples 1 to 9

The monomers in the amounts in mole % (parts by mass in parentheses) shown in Table 1 were subjected to copolymerization in the same manner as in Example 1 to obtain a vinyl compound copolymer. One hundred parts by mass of the vinyl compound copolymer obtained were mixed with polyisocyanate in the amount in part by mass shown in Table 1 to obtain paint. The paint was applied to one side of the polyester film, EMBLET S50 (trade name, ex Unitika Ltd.), at a dry thickness of 20 μm, then heated at 150° C. for 30 minutes and further allowed to stand at room temperature for 24 hours to form a paint film, resulting in a desired laminated film (Q). In Example 19, 25 parts by mass of polydimethylsiloxane were mixed together with 100 parts by mass of the vinyl compound copolymer and 34 parts by mass of polyisocyante. The resulting laminated films were subjected to the following tests (1) to (15). The results are as shown in Table 1.

The materials used were as follows:
Monomer (A): methyl methacrylate, ex Mitsubishi Rayon Co., Ltd.;
Monomer (B):X-22-2426, polydimethylsiloxane modified with methacryl at one end, molecular weight: approximately 14,000, ex Shin-Etsu Chemical Co., Ltd.;
Monomer (C): 2-hydroxyethylmethacrylate, the number of carbon atoms in the hydroxyl-containing alkyl group: 2, ex Nippon Shokubai Co., Ltd.;

Monomer (D-1): Placcel FA10L, adduct of hydroxyethyl acrylate with 10 moles of caprolactone, the number of carbon atoms in Y: 62, molecular weight: 1256; ex Daicel Corporation Monomer (D-2): prepared as will be described below, the number of carbon atoms in Y: 46, molecular weight: 1002;

Monomer (D-3): prepared as will be described below, the number of carbon atoms in Y: 52, molecular weight: 1116;

Monomer (D-4)t prepared as will be described below, the number of carbon atoms in Y: 40, molecular weight: 888;

Monomer (D-5): dehydration condensate of Placcel CD210 (polycarbonate diol, $HO—(C_6H_{12}—O—CO—O)_6—C_6H_{12}—OH$, ex Daicel Corporation) with acrylic acid, the number of carbon atoms in Y: 48, molecular weight: 1036;

Monomer (D-6): dehydration condensate of Placcel CD220 (polycarbonate diol, $HO—(C_6H_{12}—O—CO—O)_{12}—C_6H_{12}—OH$, ex Daicel Corporation) with acrylic acid, the number of carbon atoms in Y: 97, molecular weight: 2044;

Comparative monomer (D-7): Placcel FMS, adduct of hydroxyethyl methacrylate with 5 moles of caprolactone, the number of carbon atoms in Y: 32, molecular weight: 700, ex Daicel Corporation;

Comparative monomer (D-8): Placcel FM3, adduct of hydroxyethyl methacrylate with 3 moles of caprolactone, the number of carbon atoms in Y: 20, molecular weight: 472, ex Daicel Corporation;

Comparative monomer (D-9): dehydration condensate of Placcel CD230 (polycaprolactone diol, the number of carbon atoms: 158, ex Daicel Corporation) with acrylic acid, the number of carbon atoms in Y: 158, molecular weight: 3096;

Polyisocyanate: CORONATEHX, solid content: 100%, NCO content: 21.3% by mass, ex Nippon Polyurethane Industry Co., Ltd.;

Polydimethylsiloxane: polydimethylsiloxane having a viscosity of 1,000,000 CS., ex Shin-Etsu Chemical Co., Ltd.

Preparation of Monomer (D-2)

Placcel FM2D (adduct of hydroxyethyl methacrylate with 2 moles of caprolactone, molecular weight: 358, ex Daicel Corporation) was subjected to dehydration condensation with adipic acid (molecular weight: 146) in the presence of an acid catalyst to prepare methacrylate having a carboxyl-modified end, which was then subjected to dehydration condensation with Placcel 205 (caprolactone tetramer diol, $H—(O—(CH_2)_5 —CO)_2—O—CH_2—O—CH_2—O—(CO—(CH_2)_5 —O)_2 —H$, molecular weight: 534, ex Daicel Corporation) in the presence of an acid catalyst to prepare methacrylate having a hydroxyl group at an end (monomer (D-2)).

Preparation of Monomer (D-3)

The same manner as in the preparation of monomer (D-2) was repeated, except that Placcel FM3 (adduct of hydroxyethyl methacrylate with 3 moles of caprolactone, molecular weight: 472, ex Daicel Corporation) was substituted for Placcel FM2D.

Preparation of Monomer (D-4)

The same manner as in the preparation of monomer (D-2) was repeated, except that Placcel FM1D (adduct of hydroxyethyl methacrylate with 1 mole of caprolactone, molecular weight: 244, ex Daicel Corporation) was substituted for Placcel FM2D.

Test (1) Resilience From Scratch

The film (P) or the laminated film (Q) obtained above was cut in a size of 150 mm long×75 mm wide to prepare a specimen, which was than placed on a glass plate. The specimen from the laminated film (Q) was placed with the paint film being exposed. The surface of the specimen was rubbed back and forth over a distance of 100 mm 10 times by a 4-row brass brush, ex Nakaya Brush Manufacturing Co., Ltd. Then, the surface was observed to determine a time period for scratches to disappear.

G: Scratch disappeared in one minute or less,

M: Scratch disappeared in more than one minute to 24 hours.

B: No scratch disappeared after 24 hours.

(2) Resistance to Friction-Induced Scratch

The film (P) or the laminated film (Q) obtained above was cut in a size of 200 mm long×25 mm wide to prepare a specimen, which was then set on a Gakushin-type tester according to Japanese Industrial Standards (JIS) L0849. The specimen from the laminated film (Q) was set with the paint film being exposed. A calico No.3 was set fivefold at a friction terminal of the Gakushin-type tester. A load of 500 gf was put on the friction terminal, which was then moved back and forth on the surface of the specimen 200 times. The surface was observed to determine extent of scratches.

VG: No scratch was observed.

G: Less than ten minor scratches were observed.

M: Ten or more minor scratches were observed.

B: Clear scratches were observed over the whole surface.

(3) Bending Durability

The film (P) or the laminated film (Q) obtained above was cut in a size of 100 mm×50 mm, which was then adhered to an aluminum plate having a thickness of 0.3 mm using a double-adhesive tape No.500A, ex Nitto Denko Corporation, to prepare a specimen. The laminated film (Q) was adhered with the paint film being exposed. The specimen was bended at an even rate over 2 seconds to a bending angle of 180° with the paint film facing outward, using a JIS J 5600-5-1 type 1 bending test machine provided with a mandrel having a diameter of 2 mm. Then, the middle part of 30 mm long in the bended part was observed to see whether crack was formed.

G: No crack was observed.

M: No crack was observed, but the bended part whitened.

B: Cracks were observed.

(4) Impact Resistance

The film (P) or the laminated film (Q) obtained above was cut in a size of 100 mm×50 mm and then adhered to an aluminum plate having a size of 150 mm×75 mm×1 mm using a double-adhesive tape No.500A, ex Nitto Denko Corporation, to prepare a specimen. The laminated film (Q) was adhered with the paint film being exposed The specimen was placed on a Du Pont type impact tester provided with an iron ball having a diameter of ¼ inch with the paint film facing upward, and then impacted by a weight of 300 gf dropped from a height of 20 cm, according to JIS K5600-5-3. Then, the paint film was observed to see whether crack was formed.

G: No crack was observed.

B: Cracks were observed.

(5) Low-Temperature Impact Resistance

The same test as in (4) above was carried out, but at an atmospheric temperature of −10° C., The impact test was started at 5 minutes after the specimen was placed on the impact tester when the temperature of the specimen became constant.

G: No crack was observed.

B: Cracks were observed.

(6) Water Resistance

A specimen prepared as in (4) above was immersed in water at 40° C. for 168 hours and. then taken out. In an hour thereafter, the appearance of the paint film of the specimen was visually rated on the following criteria.

G: No change was observed.

M: Slight decrease in gloss or a minor spot was observed with the naked eye due to a blister, peeling or a crack which was so small as to be invisible to the naked eye, but visible under a microscope.

B: A blister, peeling or a crack was observed with the naked eye.

(7) Humidity Resistance

A specimen prepared as in (4) above was allowed to stand in a thermo-hygrostat at 50° C. and 95% RH for 168 hours and then taken out. In an hour thereafter, the appearance of the paint film of the specimen was visually rated on the same criteria as in (6) above.

(8) Heat Resistance

A specimen prepared as in (4) above was allowed to stand in a Geer oven at 100° C. for an hour and then taken out. After the specimen was further allowed to stand at room temperature for one hour or more, the appearance of the paint film of the specimen was visually rated on the same criteria as in (6) above.

(9) Acid Resistance

Two ml of 10% dilute sulfuric acid was dropped to a specimen prepared as in (4) above, which was then allowed to stand at room temperature for 24 hours and then washed thoroughly with water. After the specimen was further allowed to stand at room temperature for one hour or more, the appearance of the paint film of the specimen was visually rated on the same criteria as in (6) above.

(10) Base Resistance

Two ml of a 5% solution of sodium carbonate in water was dropped to a specimen prepared as in (4) above, which was then allowed to stand at 40° C. for 6 hours and then washed thoroughly with water. After the specimen was further allowed to stand at room temperature for one hour or more, the appearance of the paint film of the specimen was visually rated on the same criteria as in (6) above.

(11) Gasoline Resistance

Two ml of No.1 gasoline according to JIS K 2202 was dropped to a specimen prepared as in (4) above, which was then allowed to stand at room temperature for 24 hours and then washed thoroughly with water. After the specimen was further allowed to stand at room temperature for two hours or more, the appearance of the paint film of the specimen was visually rated on the same criteria as in (6) above.

(12) Alcohol Resistance

Two ml of ethanol was dropped to a specimen prepared as in (4) above, which was allowed to stand at room temperature for 24 hours and then washed thoroughly with water. After the specimen was further allowed to stand at room temperature for 24 hours or more, the appearance of the paint film of the specimen was visually rated on the same criteria as in (6) above.

(13) Weather Resistance

A specimen prepared as in (4) above was exposed to conditions in a sunshine weatherometer for 2000 hours and then washed thoroughly with water. After the specimen was further allowed to stand at room temperature for 24 hours or more, the appearance of the paint film of the specimen was visually rated on the same criteria as in (6) above.

(14) Stain Resistance

Three specimens prepared as in (4) above were allowed to stand outdoors for 80, 160 and 2 4 0 days, respectively, and then washed thoroughly with water. After these specimens were further allowed to stand at room temperature for 24 hours or more, the appearances of the paint films of the specimens were visually rated on the following criteria.

VG: No change was observed in all of the specimens.

G: Reduction in gloss, a blister or peeling was observed only in the specimen which had been allowed to stand for 240 days.

M: No change was observed in the specimen which had been allowed to stand tor 80 days, but reduction in gloss, a blister or peeling was observed in the other two specimens.

B: Reduction in gloss, a blister or peeling was observed in all of the specimens.

(15) Handling Property

The film (P) or the laminated film (Q) obtained above was cut in a size of 100×25 mm, which was then fixed to a tension tester, Tensilon RTG-1310 manufacture by A&D, with a chuck distance of 50 mm, and drawn at a tension speed of 200 mm/min. to determine a 10% modulus. The less the modulus is, the more the film is likely to break during its handling, that is, the worse the handling property is.

G: The 10% modulus was 10N/25 mm or more.

M: The 10% modulus was 1N/25 mm to less than 10N/25 mm.

B: The 10% modulus was less than 1N/25 mm.

TABLE 1

| | | Example 1 | Example 2 | Example 3 | Example 4 | Example 5 | Example 6 | Example 7 |
|---|---|---|---|---|---|---|---|---|
| Thermoplastic resin film | | Not applied | Applied | Applied | Applied | Applied | Applied | Applied |
| Vinyl compound copolymer, mole % (part by mass) | Monomer (A) | 64.5 (14) | 64.5 (14) | 64.5 (24.5) | 64.5 (23.5) | 64.58 (25.6) | 64.5 (15) | 64.5 (11) |
| | Monomer (B) | 0.5 (15) | 0.5 (15) | 0.5 (26.5) | 0.5 (25.5) | 0.5 (27.7) | 0.5 (17) | 0.5 (11) |
| | Monomer (C) | 25 (15) | 25 (15) | 25 (11.0) | 25 (10.5) | 25 (11.5) | 25 (16) | 25 (11) |
| | Monomer (D-1) | 10 (57) | 10 (57) | | | | | |
| | Monomer (D-2) | | | 10 (38.0) | | | | |
| | Monomer (D-3) | | | | 10 (40.5) | | | |
| | Monomer (D-4) | | | | | 10 (35.2) | | |
| | Monomer (D-5) | | | | | | 10 (52) | |
| | Monomer (D-6) | | | | | | | 10 (68) |
| | Comparative monomer (D-7) | | | | | | | |
| | Comparative monomer (D-8) | | | | | | | |
| | Comparative monomer (D-9) | | | | | | | |
| Polydimethylsiloxane, part by mass | | | | | | | | |
| Polyisocyanate, part by mass | | 34 | 34 | 40 | 40 | 40 | 37 | 25 |
| Results of rating | Resilience from scratch | G | G | G | G | G | G | G |
| | Resistance to friction-induced scratch | VG | VG | VG | VG | G | VG | VG |

TABLE 1-continued

|  |  | | | | | | | |
|---|---|---|---|---|---|---|---|---|
|  | Bending durability | G | G | G | G | G | G | G |
|  | Impact resistance | G | G | G | G | G | G | G |
|  | low-temperature impact resistance | G | G | G | G | G | G | G |
|  | Water resistance | G | G | G | G | G | G | G |
|  | Humidity resistance | G | G | G | G | G | G | G |
|  | Heat resistance | G | G | G | G | G | G | G |
|  | Acid resistance | G | G | G | G | G | G | G |
|  | Base resistance | G | G | G | G | G | G | G |
|  | Gasolin resistance | G | G | G | G | G | G | M |
|  | Ethanol resistance | G | G | G | G | G | G | M |
|  | Weather resistance | G | G | G | G | G | G | M |
|  | Stain resistance | VG | VG | VG | VG | VG | VG | G |
|  | Handling property | M | G | G | G | G | G | G |

|  |  | Example 8 | Example 9 | Example 10 | Example 11 | Example 12 | Example 13 | Example 14 |
|---|---|---|---|---|---|---|---|---|
| Thermoplastic resin film |  | Applied | Applied | Applied | Applied | Applied | Applied | Applied |
| Vinyl compound copolymer, mole % (part by mass) | Monomer (A) | 54.5 (9) | 54.5 (9) | 49.5 (10) | 69 (23) | 69.5 (21) | 64.5 (22) | 64.5 (12) |
|  | Monomer (B) | 0.5 (12) | 0.5 (12) | 0.5 (14) | 1 (46) | 0.5 (21) | 0.5 (23) | 0.5 (12) |
|  | Monomer (C) | 32 (16) | 32 (16) | 42 (27) | 25 (11) | 25 (20) | 32 (29) | 21 (10) |
|  | Monomer (D-1) | 13 (63) | 13 (63) | 8 (49) | 5 (21) | 5 (38) | 3 (26) | 14 (66) |
|  | Monomer (D-2) |  |  |  |  |  |  |  |
|  | Monomer (D-3) |  |  |  |  |  |  |  |
|  | Monomer (D-4) |  |  |  |  |  |  |  |
|  | Monomer (D-5) |  |  |  |  |  |  |  |
|  | Monomer (D-6) |  |  |  |  |  |  |  |
|  | Comparative monomer (D-7) |  |  |  |  |  |  |  |
|  | Comparative monomer (D-8) |  |  |  |  |  |  |  |
|  | Comparative monomer (D-9) |  |  |  |  |  |  |  |
| Polydimethylsiloxane, part by mass |  |  |  |  |  |  |  |  |
| Polyisocyanate, part by mass |  | 19 | 25 | 44 | 21 | 39 | 52 | 28 |
| Results of rating | Resilience from scratch | M | M*1 | M | G | G | M | G |
|  | Resistance to friction-induced scratch | G | G | G | G | G | G | G |
|  | Bending durability | M | M | G | G | M | M | G |
|  | Impact resistance | G | G | G | G | G | G | G |
|  | low-temperature impact resistance | G | G | G | G | G | G | G |
|  | Water resistance | G | G | G | G | G | G | G |
|  | Humidity resistance | G | G | G | G | G | G | G |
|  | Heat resistance | G | G | G | G | G | G | G |
|  | Acid resistance | G | G | G | G | G | G | G |
|  | Base resistance | G | G | G | G | G | G | G |
|  | Gasolin resistance | G | G | G | G | G | G | G |
|  | Ethanol resistance | G | G | G | G | G | G | G |
|  | Weather resistance | G | G | G | G | G | G | M |
|  | Stain resistance | G | G | VG | VG | G | VG | G |
|  | Handling property | G | G | G | G | G | G | G |

|  |  | Example 15 | Example 16 | Example 17 | Example 18 | Example 19 | Comp. Ex. 1 | Comp. Ex. 2 |
|---|---|---|---|---|---|---|---|---|
| Thermoplastic resin film |  | Applied | Applied | Applied | Applied | Applied | Applied | Applied |
| Vinyl compound copolymer, mole % (part by mass) | Monomer (A) | 69.6 (27) | 64.9 (24) | 63.5 (7) | 61.8 (4) | 51.1 (26.3) | 84.5 (31) | 39.7 (12) |
|  | Monomer (B) | 0.4 (22) | 0.1 (5) | 1.5 (22) | 3.2 (25) | 0.2 (12.5) | 0.5 (26) | 0.3 (13) |
|  | Monomer (C) | 22 (11) | 25 (15) | 25 (15) | 25 (15) | 35.6 (21.3) | 11 (10) | 45 (18) |
|  | Monomer (D-1) | 8 (40) | 10 (57) | 10 (57) | 10 (57) | 13.1 (40) | 4 (34) | 15 (57) |
|  | Monomer (D-2) |  |  |  |  |  |  |  |
|  | Monomer (D-3) |  |  |  |  |  |  |  |
|  | Monomer (D-4) |  |  |  |  |  |  |  |
|  | Monomer (D-5) |  |  |  |  |  |  |  |
|  | Monomer (D-6) |  |  |  |  |  |  |  |
|  | Comparative monomer (D-7) |  |  |  |  |  |  |  |
|  | Comparative monomer (D-8) |  |  |  |  |  |  |  |
|  | Comparative monomer (D-9) |  |  |  |  |  |  |  |
| Polydimethylsiloxane, part by mass |  |  |  |  |  | 25 |  |  |
| Polyisocyanate, part by mass |  | 26 | 34 | 34 | 34 | 34 | 27 | 38 |
| Results of rating | Resilience from scratch | G | G | G | G | G | M | B |
|  | Resistance to friction-induced scratch | G | M | VG | VG | VG | B | B |
|  | Bending durability | G | G | G | G | G | G | M |
|  | Impact resistance | G | G | G | G | G | G | M |
|  | low-temperature impact resistance | G | G | G | G | G | B | B |
|  | Water resistance | G | G | G | G | G | G | G |
|  | Humidity resistance | G | G | G | G | G | G | G |
|  | Heat resistance | G | G | G | G | G | G | G |
|  | Acid resistance | G | G | G | G | G | G | G |

TABLE 1-continued

|  | | | | | | | |
|---|---|---|---|---|---|---|---|
| Base resistance | G | G | G | G | G | G | G |
| Gasolin resistance | G | G | G | G | G | B | G |
| Ethanol resistance | G | G | G | G | G | B | G |
| Weather resistance | M | G | G | G | G | B | G |
| Stain resistance | G | VG | VG | G | M | B | VG |
| Handling property | G | G | G | G | G | G | G |

| | | Comp. Ex. 3 | | Comp. Ex. 4 | | Comp. Ex. 5 | | Comp. Ex. 6 | | Comp. Ex. 7 | | Comp. Ex. 8 | | Comp. Ex. 9 | |
|---|---|---|---|---|---|---|---|---|---|---|---|---|---|---|---|
| Thermoplastic resin film | | Applied | | Applied | | Applied | | Applied | | Applied | | Applied | | Applied | |
| Vinyl | Monomer (A) | 74.5 | (29) | 54.5 | (7) | 64.5 | (19) | 57.5 | (28) | 64.5 | (22) | 64.5 | (8) | 61.0 | (3) |
| compound | Monomer (B) | 0.5 | (28) | 0.5 | (8) | 0.5 | (20) | 0.3 | (20) | 0.5 | (23) | 0.5 | (8) | 4.0 | (26) |
| copolymer, | Monomer (C) | 25 | (30) | 23 | (8) | 25 | (19) | 30.1 | (17) | 25 | (22) | 25 | (8) | 25 | (16) |
| mole % | Monomer (D-1) | 0 | | 22 | (76) | | | | | | | | | 10 | (58) |
| (part by | Monomer (D-2) | | | | | | | | | | | | | | |
| mass) | Monomer (D-3) | | | | | | | | | | | | | | |
| | Monomer (D-4) | | | | | | | | | | | | | | |
| | Monomer (D-5) | | | | | | | | | | | | | | |
| | Monomer (D-6) | | | | | | | | | | | | | | |
| | Comparative monomer (D-7) | | | | | 10 | (42) | 12.1 | (35) | | | | | | |
| | Comparative monomer (D-8) | | | | | | | | | 10 | (33) | | | | |
| | Comparative monomer (D-9) | | | | | | | | | | | 10 | (76) | | |
| Polydimethylsiloxane, part by mass | | | | | | | | | | | | | | | |
| Polyisocyanate, part by mass | | 46 | | 25 | | 45 | | 45 | | 52 | | 19 | | 34 | |
| Results of rating | Resilience from scratch | B | | M | | G | | G | | M | | G | | G | |
| | Resistance to friction-induced scratch | B | | B | | B | | B | | M | | G | | VG | |
| | Bending durability | B | | G | | G | | G | | M | | G | | G | |
| | Impact resistance | B | | G | | G | | G | | G | | G | | G | |
| | low-temperature impact resistance | B | | G | | B | | B | | B | | G | | G | |
| | Water resistance | G | | G | | G | | G | | G | | G | | G | |
| | Humidity resistance | G | | G | | G | | G | | G | | G | | G | |
| | Heat resistance | G | | G | | G | | G | | G | | G | | G | |
| | Acid resistance | G | | G | | G | | G | | G | | G | | G | |
| | Base resistance | G | | G | | G | | G | | G | | G | | G | |
| | Gasolin resistance | G | | M | | G | | G | | G | | M | | G | |
| | Ethanol resistance | G | | M | | G | | G | | G | | M | | G | |
| | Weather resistance | G | | M | | G | | G | | G | | M | | G | |
| | Stain resistance | VG | | B | | VG | | VG | | VG | | B | | B | |
| | Handling property | G | | G | | G | | G | | G | | G | | G | |

*[1]Longer time was taken than that in Example 8 before scratches disappeared.

As seen in Table 1, the present paint film and the present laminated film were superior in scratch resistance and also in stain resistance weather resistance, chemical resistance, bending durability and impact resistance.

On the other hand, the laminated film of Comparative Example 1, where the total amount of monomer (A) and monomer (B) was too much and, therefore, the equation (2) was not met, was inferior in scratch resistance, chemical resistance, weather resistance and stain resistance. The laminated film of Comparative Example 2, where the total amount of monomer (A) and monomer (B) was too little and, therefore, the equation (2) was not met, was inferior in scratch resistance and low-temperature impact resistance. The laminated film of Comparative Example 3, where the amount of monomer (C) was too much and, therefore, the equation (3) was not met, was inferior in scratch resistance, bending durability and impact resistance. The laminated film of Comparative Example 4, where the amount of monomer (C) was toe little, was inferior in scratch resistance and stain resistance. The laminated films of Comparative Examples 5 to 7, where the used monomer having an hydroxyl end group-containing alkyl group has less carbon atoms than that in monomer (D), was inferior in scratch resistance and low-temperature impact resistance. The laminated film of Comparative Example 8, where the used monomer having a hydroxyl end group-containing alkyl group has more carbon atoms than that in monomer (D), was inferior in stain resistance. The laminated film of Comparative Example 9, where the amount of monomer (B) was too much, was inferior in stain resistance.

Example 20

A composition of 100 parts by mass of polyvinyl chloride (polymerization degree: 1100, ex Shin-Etsu Chemical Co., Ltd.), 20 parts by mass of a polyester plasticizer (HA-5 (trade name), ex Kao Corporation) and 5 parts by mass of carbon black (MCF#1000 (trade name), ex Mitsubishi Chemical Corporation) was calendered to obtain a film substrate having a thickness of 100 μm. A paint film prepared in the same manner as in Example 1, but having the thickness of 15 μm was attached to one side of the film substrate using a metal roll to obtain a laminated film. Then, the surface of the paint film was pressed with a satin-embossing roll having a surface roughness Rz of 30 μm at 100° C. and 5 kg/cm² to obtain embossed film 1.

Example 21

The same procedures as in Example 20 were repeated to obtain embossed film 2, except that the thickness of the paint film was 25 μm.

Example 22

The same procedures as in Example 20 were repeated to obtain embossed film 3, except that the thickness of the film substrate was 250 μm.

Example 23

The same procedures as in Example 20 were repeated to obtain embossed film 4, except that a composition of 100 parts by mass of PET-G resin (EASTAR G6763, ex Eastman Chemical Company) and 5 parts by mass of carbon black (MCF#1000 (trade name), ex. Mitsubishi Chemical Corporation) was subjected to extrusion die molding to obtain a film substrate having a thickness of 100 μm.

Reference Example 1

The same procedures as in Example 20 were repeated to obtain embossed film 5, except that the surface roughness Rz of the embossing roll was 10 μm.

Reference Example 2

The same procedures as in Example 20 were repeated to obtain embossed film 6, except that the thickness of the paint film was 5 μm.

Reference Example 3

The same procedures as in Example 20 were repeated to obtain embossed film 7, except that the thickness of the paint film was 40 μm.

Comparative Example 10

The same procedures as in Example 20 were repeated to obtain embossed film 8, except that paint used to form a paint film was composed of 100 parts by weight of ALLEX26 K-37 (trade name, ex Nippon Kako Toryo Co., Ltd.) and 10 parts by weight of a curing agent, ALLEX 26, and did not have resilience from scratch.

The embossed films 1 to 8 prepared above were subjected to the following test on embossing processability and to the aforesaid tests (1) to (14). The results are as shown in Table 2.

Embossing Processability

The surface of the paint film of the embossed film obtained above was visually rated on the following criteria.

G: Emboss pattern was formed over the whole surface of the paint film with no crack or hole.

B: Little or no emboss pattern was formed, or the paint film had a crack or a hole.

(C) c mole % of a vinyl compound which has a linear or branched alkyl group having a hydroxyl group, the alkyl group having 1 to 6 carbon atoms; and (D) d mole % of a vinyl compound represented by the following formula:

$$CH_2=C(R)-COO-Y$$

wherein R is H or $CH_3$, and Y is a linear or branched saturated hydrocarbon group with a hydroxyl group at an end and, optionally, may have one or more groups selected from the group consisting of a ring-opened lactone group, —CO—$(CH_2)_n$—O— wherein n is an integer of 4 to 6, a carbonate group, —O—CO—O—, an ester group, —CO—O—, an ether group, —O—, and a urethane groups —NH—CO—O—, and Y has 40 to 120 carbon atoms, and a to d meet the following equations:

$$a+b+c+d=100,$$

$$(1) 0 < \{b/(a+b)\} \times 100 \leq 5,$$

$$(2) 3(c+d)/4 \leq (a+b) \leq 4(c+d), \text{ and}$$

$$(3) 4d/3 \leq c \leq 40d.$$

2. A film according to claim 1, wherein Y in monomer unit (D) has one or more groups selected from the group consisting of the ring-opened lactone group, the carbonate group, the ester group, the ether group and the urethane group.

3. A laminated film comprising the film according to claim 1, laminated on at least one side of a thermoplastic resin film.

4. A scratch resistant film comprising the film according to claim 1.

5. An article comprising the scratch resistant film according to claim 4.

6. A laminated film comprising the film according to claim 2, laminated on at least one side of a thermoplastic resin film.

7. A scratch resistant film comprising the film according to claim 2.

8. A scratch resistant film comprising the laminated film according to claim 3.

9. A scratch resistant film comprising the laminated film according to claim 6.

10. An article comprising the scratch resistant film according to claim 7.

11. An article comprising the scratch resistant film according to claim 8.

TABLE 2

|  | Example 20 | Example 21 | Example 22 | Example 23 | Ref. Ex. 1 | Ref. Ex. 2 | Ref. Ex. 3 | Comp. Ex. 10 |
|---|---|---|---|---|---|---|---|---|
| Embossing processability | G | G | G | G | B *1 | B *2 | B *1 | G |
| Resilience from scratch | G | G | G | G | G | —*3 | G | B |
| Stain resistance | G | G | G | G | G | —*3 | G | G |

*1 No emboss pattern was formed.
*2 The paint film cracked.
*3 The test could not be carried out because the paint fim cracked.

The invention claimed is:

1. A film obtained by cross-linking a vinyl compound copolymer with polyisocyanate, wherein the vinyl compound copolymer comprises the following monomer units:

(A) a mole % of a vinyl compound which has no siloxane structure, nor hydroxyl group;

(B) b mole % of a vinyl compound which has a polydimethylsiloxane structure and no hydroxyl group;

12. An article comprising the scratch resistant film according to claim 9.

13. The scratch resistant film according to claim 4, wherein the film has an embossed pattern on one side.

14. The scratch resistant film according to claim 7, wherein the film has an embossed pattern on one side.

15. The scratch resistant film according to claim 8, wherein the laminated film has an embossed pattern on the surface of the film.

16. The scratch resistant film according to claim 9, wherein the laminated film has an embossed pattern on the surface of the film.

17. An article comprising the scratch resistant film according to claim 13.

18. An article comprising the scratch resistant film according to claim 14.

19. An article comprising the scratch resistant film according to claim 15.

20. An article comprising the scratch resistant film according to claim 16.

* * * * *